United States Patent
Hoffmann et al.

(10) Patent No.: US 6,854,944 B2
(45) Date of Patent: Feb. 15, 2005

(54) QUICK MOUNTING NUT

(75) Inventors: Armin Hoffmann, Landsberg (DE);
Ulrich Birnbaum, Kaufering (DE);
Stefan Unverzagt, Penzing (DE);
Armin Herb, Apfeldorf (DE)

(73) Assignee: Hilti Aktiengesellschaft, Schaan (LI)

(*) Notice: Subject to any disclaimer, the term of this patent is extended or adjusted under 35 U.S.C. 154(b) by 114 days.

(21) Appl. No.: 10/391,894

(22) Filed: Mar. 19, 2003

(65) Prior Publication Data

US 2003/0175094 A1 Sep. 18, 2003

Related U.S. Application Data

(62) Division of application No. 10/014,142, filed on Oct. 8, 2001, now Pat. No. 6,632,058.

(30) Foreign Application Priority Data

Oct. 23, 2000 (DE) .......................................... 100 52 445

(51) Int. Cl.[7] ............................................... F16B 37/08
(52) U.S. Cl. ..................... 411/433; 411/267; 411/530
(58) Field of Search ................................ 411/432, 433, 411/436, 437, 265–267, 530, 352, 353, 435, 173; 285/321, 305, 308

(56) References Cited

U.S. PATENT DOCUMENTS

| | | | | |
|---|---|---|---|---|
| 2,102,554 A | * | 12/1937 | Churchill ..................... | 411/173 |
| 4,378,187 A | * | 3/1983 | Fullerton ..................... | 411/267 |
| 5,098,241 A | * | 3/1992 | Aldridge et al. ............ | 411/433 |
| 5,466,106 A | * | 11/1995 | Bone et al. ................. | 411/433 |
| 5,528,812 A | * | 6/1996 | Muller ....................... | 29/432.2 |
| 6,062,784 A | * | 5/2000 | Wisser et al. ............... | 411/267 |
| 6,102,447 A | * | 8/2000 | Aldridge ..................... | 285/305 |
| 6,305,889 B1 | * | 10/2001 | Blessing et al. ............ | 411/353 |
| 6,632,058 B2 | * | 10/2003 | Hoffmann et al. .......... | 411/433 |

* cited by examiner

Primary Examiner—Flemming Saether
Assistant Examiner—Jori Schiffman
(74) Attorney, Agent, or Firm—Sidley Austin Brown & Wood, LLP

(57) ABSTRACT

A quick mounting nut (2) movable, at least partially, without being rotated, axially to a threaded bolt (1), with a springing wire clip (4) being located in a nut housing (5) with a continuous coaxial opening (6), with the wire clip (4) at least partially engaging in a bolt thread (3) and having two legs (8, 8') which spring relative to one another, with the opening (6) having an inner cone (7) which narrows radially from an axial neutral position of the wire clip (4) and with the wire clip (4) being movable axially to a limited extent and contacting at least partially inside the inner cone (7) in its locking position.

9 Claims, 6 Drawing Sheets

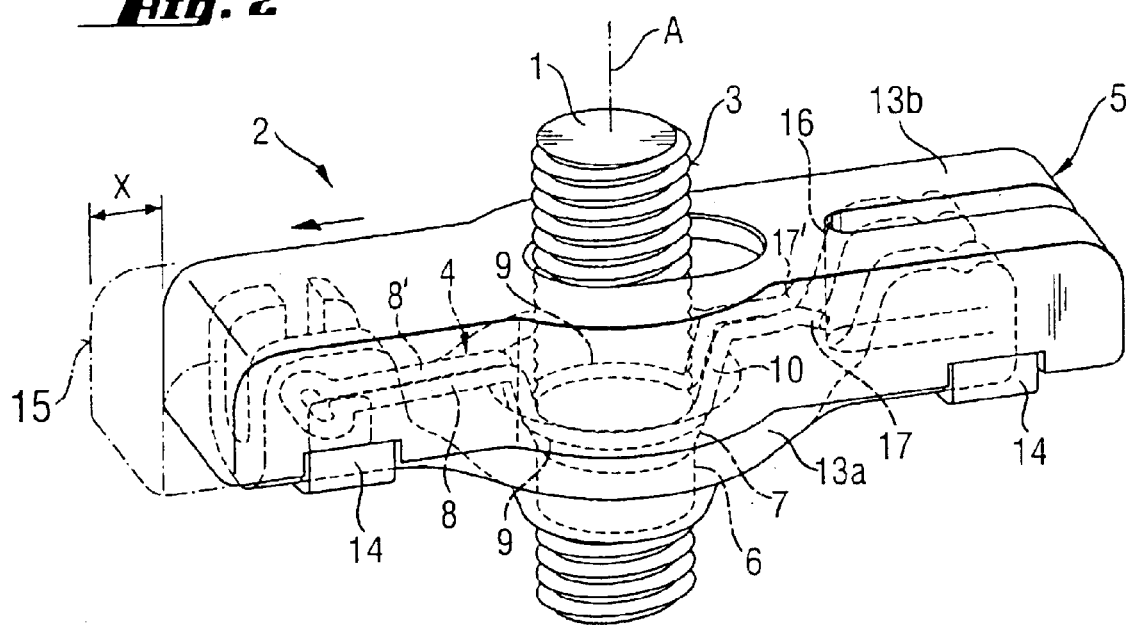

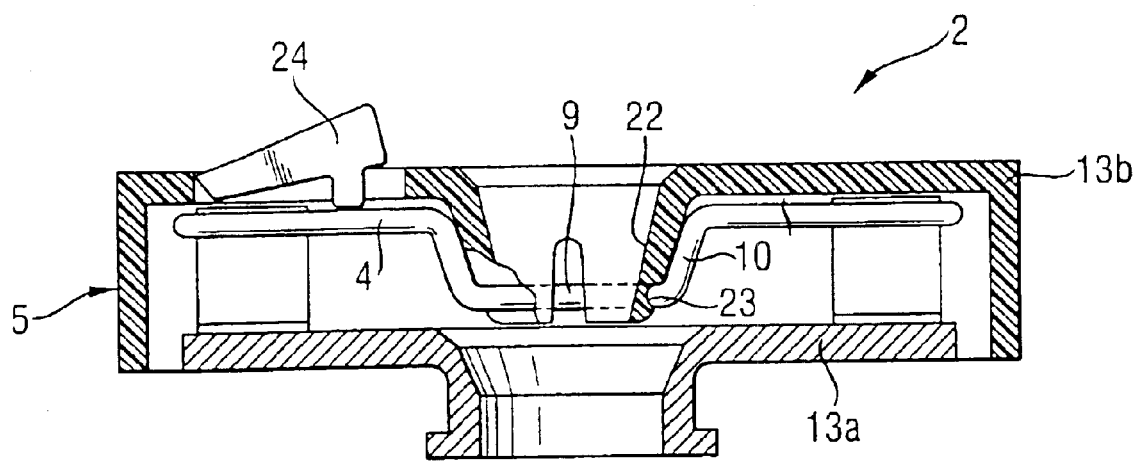
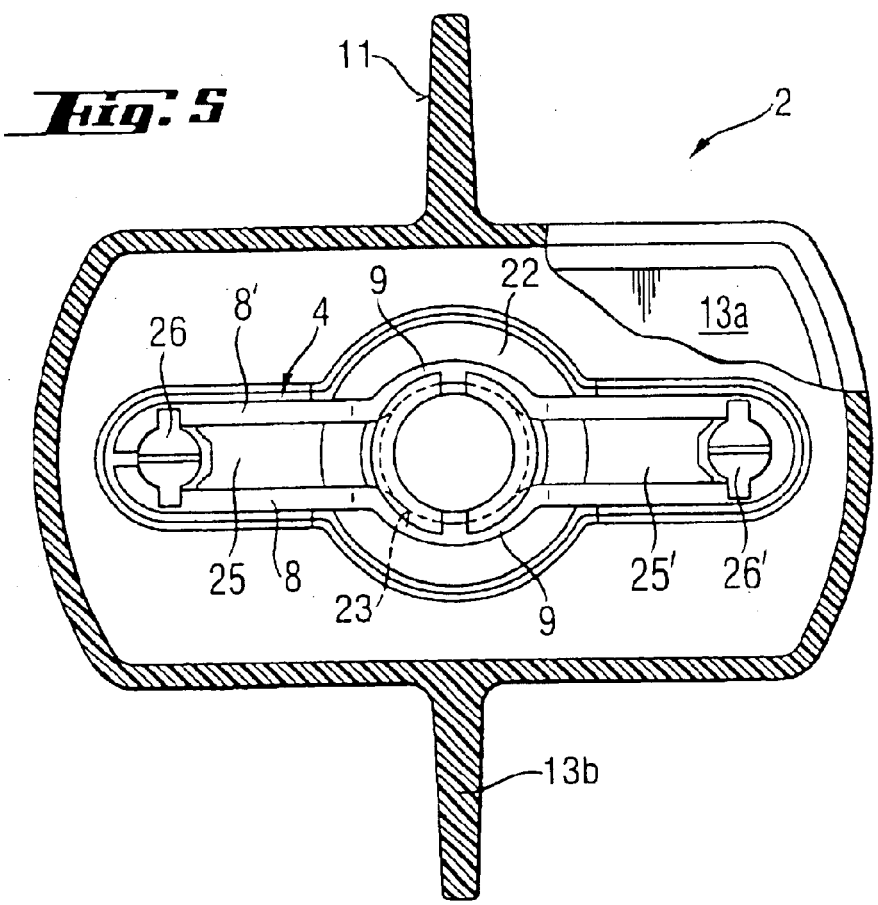

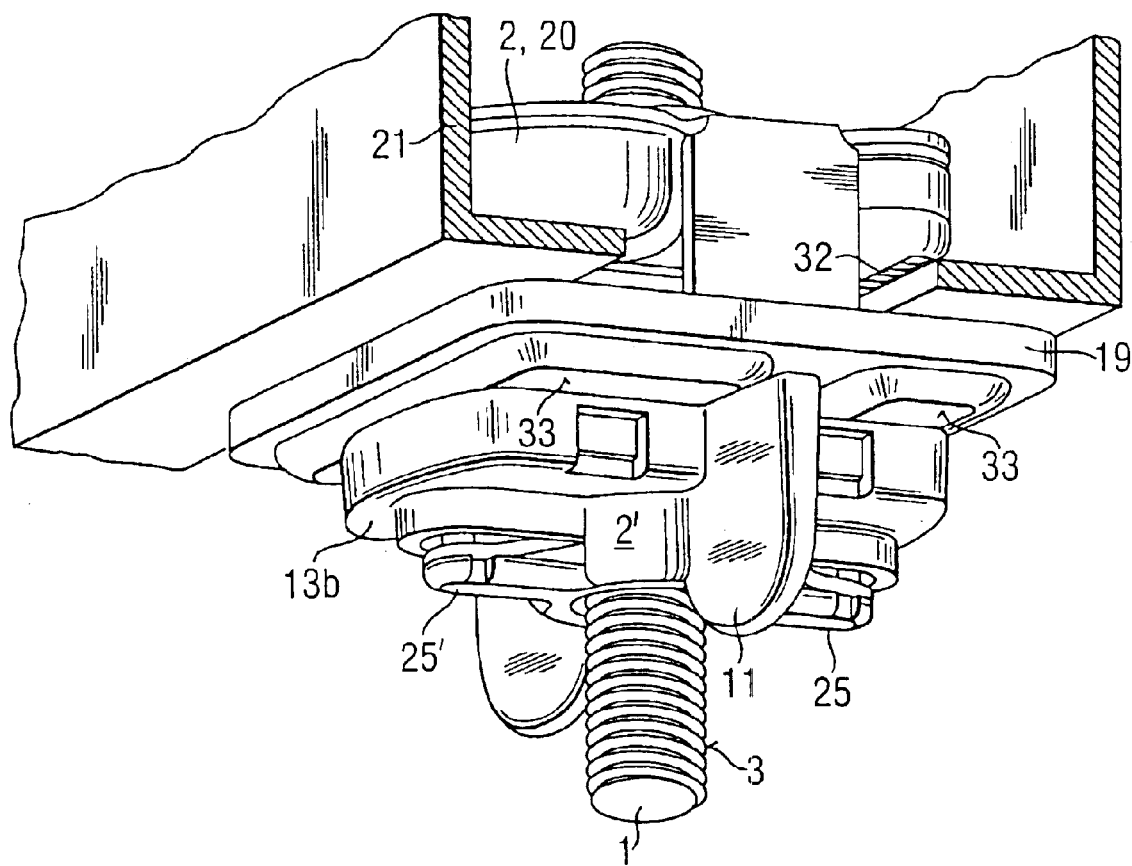

QUICK MOUNTING NUT

RELATED APPLICATIONS

This application is a division of application Ser. No. 10/014,142 filed Oct. 8, 2001 now U.S. Pat No. 6,632,058.

BACKGROUND OF THE INVENTION

1. Field of the Invention

The invention is directed to a quick mounting nut, formed preferably as a fastening system for mounting bolts threaded rods which hang down in installation rails.

2. Description of the Prior Art

A quick mounting nut generally has radial inner engagement means which engages in a positive-locking manner in the outer thread of a bolt and which permits a screwing movement along the thread as the sole degree of freedom of movement of the nut which is positioned on the bolt. The nut is secured by the static friction of the thread with the engagement means of the axially clamped nut.

According to DE19737262A1, a facade fastening arrangement for mounting C-shaped sections has a wire clip with two springing legs which snap into elongated undercut openings of an axial supporting element in a friction-locking manner and positively engages therein. Such a force locking, snap-in fastening is unsuitable for threads with sloping flanks.

According to DE347859, a wire clip which is constructed as a wing nut for manual assembly engages in the threads of a bolt on both sides.

According to EP0084280, a springing wire clip, which has two legs and is constructed as a wire nut, engages in the threads of a bolt with both radial legs in the manner of a coil.

According to U.S. Pat. No. 3,880,041, a springing fastening element, which is constructed as a nut, contains in its hollow interior a wire clip which is wound coaxially in the shape of a coil and which engages in the threads. Axial positioning without screwing movement is not possible with these nuts.

According to DE-43-07-645, the wire clip of a quick mounting nut engages only partially in the threads, so that the quick mounting nut can be positioned axially by axial pressure.

According to DE19831001, a quick mounting nut with a wire clip, which is wound coaxially in the shape of a coil, is constructed as a self-locking wing nut in the interior of a nut housing and enables axial positioning without screwing movement, is secured by a screwing movement, and can be unlocked by a loosening torque acting along the wire clip. The engagement in the threads, which takes place only in a frictionally locking manner, does not permits to secure the quick mounting nut so that it would be able to withstand a load.

In order to fasten pipelines in installation rails, special rail nuts associated with the installation rails are used as part of a fastening system and are provided with a metric thread. A threaded rod or bolt serves as a connection element between the pipe clamp and the rail nut as well as for height adjustment. The threaded rods, which are supplied by the meter, are cut to the required length for mounting. As a result of cutting burs are formed and must be removed by cutting before screwing the rod into the rail nut. The cutting and height adjustment are very time-consuming.

DE4403974 discloses quick mounting nuts, which can be positioned axially to the threaded rod without being subjected to screwing movement. For this purpose, the engagement means of the quick mounting nut, which are constructed as threaded sectors and engage in the thread of the threaded rod in a positive-locking manner, can swivel out axially in a springing manner. After a screwing movement effected for securing the quick mounting nut, the swiveled-in engagement means, which are fixed at a stop, engage in a positive-locking manner in the thread of the threaded rod.

Further, DE4243185 discloses special rail nuts which are arranged inside the installation rails and comprise a pressure plate which is pre-mounted by snapping in for mounting on installation rails that are fixed on the outside of installation rails by another nut.

It is the object of the invention to further develop a quick mounting nut which fastens in a positive-locking manner.

Another object of the present invention is a quickly mounted fastening system for mounting at installation rails.

SUMMARY OF THE INVENTION

These and other objects of the present invention, which will become apparent hereinafter, are achieved by providing a detachable quick mounting nut, which is movable axially relative to a threaded bolt and which comprises a springing wire clip within a nut housing with a coaxial through-opening, which wire clip partially engages in at least one thread, essentially has an inner cone which narrows radially within this continuous coaxial opening from the axial neutral position of the wire clip. The wire clip, which is movable axially to a limited extent, can contact at least partially the inner cone. The wire clip has two legs which spring relative to one another. Each of the legs, which extend almost parallel to each other, partially engages in the thread of the threaded bolt in a slightly radially friction-locking manner within the radial plane, so that the wire clip is displaceable partially axially in the inner cone by screwing movements.

As a result of this external positive movement conveyed through the inner cone, a screw-like, positive-locking fastening of the quick mounting nut takes place, with the wire clip engaging in the thread of the threaded bolt.

It is further advantageous that the wire clip is supported so as to be movable axially in a limited manner within a nut housing forming a manual nut.

A further advantage consists in that the nut housing comprises two shells which are guided so as to be movable relative to one another along the wire clip. One of these shells, serving as unlocking means, is a cover shell forming a wedge which is directed radially inward and which, in a first position, can be guided between the free ends of the legs of the wire clip so as to spread the latter against their pretensioning, so that the quick mounting nut can be positioned axially without a screwing movement. In the second position, the wire clip which is axially offset due to the directed rotation of the quick mounting nut and makes contact within the coaxial inner cone causes a positive engagement with the thread, so that the quick mounting nut can be secured and also loosened by screwing movements. The quick mounting nut is constructed so as to be switchable between the first position and second position, so that the connection can be canceled again.

The shells which are movable relative to one another are advantageously connected with one another via snap-in means which, in a further advantageous manner, form a guide along the wire clip embedded on the inside.

A fastening sleeve is advantageously formed integral coaxially on the side of the nut housing forming the inner cone. By means of this fastening sleeve, the quick mounting nut can be connected in a coaxially rotatable manner with a pressure plate or a rail nut constructed for mounting at installation rails.

In another embodiment, a cover shell advantageously has a radially expandable, coaxial outer cone sleeve with a radial outer circumferentially extending annular groove for the middle part of the wire clip in which the latter can be secured axially without tension. The outer cone sleeve is slit axially and can accordingly expand radially in a springing manner when the threaded bolt is inserted through it. In addition, the cover shell has a switching element in the radial outer area as fastening means for locking. When the switching element makes axial contact when actuated, the wire clip, which is supported on one side in an axially offset manner within the nut housing and which is secured axially in the annular groove is displaceable axially out of the annular groove to a limited degree and, through its own radial tension, automatically slides axially along the outer cone sleeve and engages in the threads.

The cover shell, with the radially expandable coaxial outer cone sleeve as actuating means for locking, advantageously has at least one, advantageously two, oppositely arranged, radially projecting, axially springing projecting arms which have, in the radial outer area, an axial bearing pin for the wire clip which is oriented toward the wire clip. These projecting arms in turn advantageously form expanding springing locking protuberances with which the radial outer areas of the wire clip can be snapped in in an axially fastening manner inside the legs, so that by actuating one of the projecting arms, or advantageously both of them simultaneously, the wire clip which is accordingly tensioned axially can be displaced axially out of the annular groove to a limited extent and slides over the outer cone into the thread.

The cover shell advantageously forms the gripping surfaces of the wing nut vertical to the projecting arms which are oriented along the wire clip.

In an advantageous alternative embodiment, a quick mounting nut is constructed as a plug-in rail nut with a cover shell securely connectable with the pressure plate via two webs of the quick mounting nut.

The webs are advantageously secured to the cover shell via respective film hinges. The webs hold the quick mounting nut at a predetermined distance from the pressure plate and are originally folded up during production and for easier preassembly.

The webs advantageously swivel a hold-down device, which is formed integral therewith, axially over the base shell of the quick mounting nut and press it against the wire clip, which is integrated therebetween inside the quick mounting nut and which is flexible axially to a limited extent accompanied by a slight axial pretensioning. The axially pretensioned gap which occurs between the two shells makes it possible to compensate the mounting thickness of the installation rails with a usual tolerance of about 0.4 mm when the plug-in rail nuts are mounted.

The quick mounting nut advantageously has teeth on the surface oriented in the direction of the base plate. Therefore, the wire clip makes possible, in addition, a pretensioned engagement of the teeth of the quick mounting nut in the counter-toothing of the installation rails. The wire clip accordingly combines the above-mentioned fastening function at the threaded rod with the mounting function at the installation rails by applying an axial pretensioning.

With respect to its basic shape, the quick mounting nut advantageously has a width which is slightly smaller than the opening of the C-shaped installation rails, so that the quick mounting nut can be inserted through the opening in the installation rail, and a length which is somewhat smaller than the inner dimension of the installation rail, so that the quick mounting nut which is oriented transverse to the rail axis can be supported in an axial positive engagement and is freely movable along the installation rail, and two diagonally opposed axial edges which are rounded corresponding to the circle of diameter Y' which can be inscribed in the installation rail. As a result, the quick mounting nut which is introduced along the rail axis can be rotated into the installation rail only by turning clockwise. The nut is essentially prism-shaped.

An alternative fastening system for mounting at installation rails is advantageously constructed with two quick mounting nuts, wherein a first quick mounting nut which is constructed as a rail nut can be inserted into a C-shaped installation rail so as to be fixedly connected with the base plate. A second quick mounting nut, which is connected via the threaded rod inserted coaxially into both quick mounting nuts and which is constructed as a locking nut and can be screwed in by rotation, can be secured by static friction to the facing plane partial surfaces of the base plate and can be loosened again via unlocking means.

The two legs of the wire clip advantageously have an inclination which corresponds to that of the threaded bolt in order to ensure a positive-locking connection between the outer contour of the threaded bolt and the wire clip.

The novel features of the present invention, which are considered as characteristic for the invention, are set forth in the appended claims. The invention itself, however, both as to its construction and its mode of operation, together with additional advantages and objects thereof, will be best understood from the following detailed description of preferred embodiment, when read with reference to the accompanying drawings.

BRIEF DESCRIPTION OF THE DRAWINGS

The drawings show:

FIG. 2 a perspective view of the quick mounting nut with shells;

FIG. 4 a cross-sectional view a locking nut with a switching element;

FIG. 5 cross-sectional view a locking nut with a projecting arm;

FIG. 7 a perspective view of a fastening system for mounting at installation rails with two quick mounting nuts according to the present invention.

DETAILED DESCRIPTION OF THE PREFERRED EMBODIMENT

Figure 1:
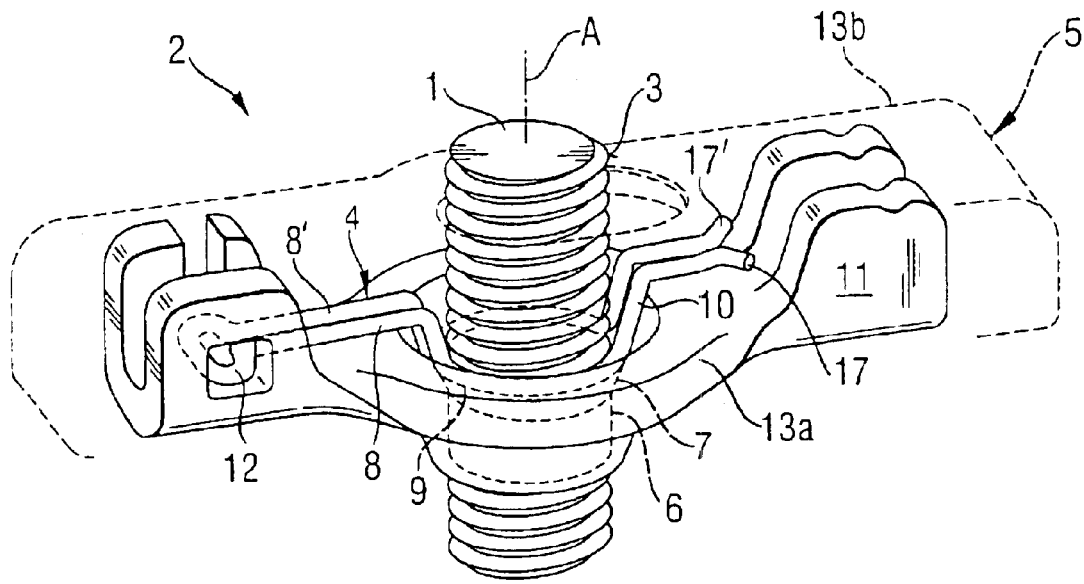
FIG. 1 a perspective view of a quick mounting nut according to the present invention.
Figure 1A:
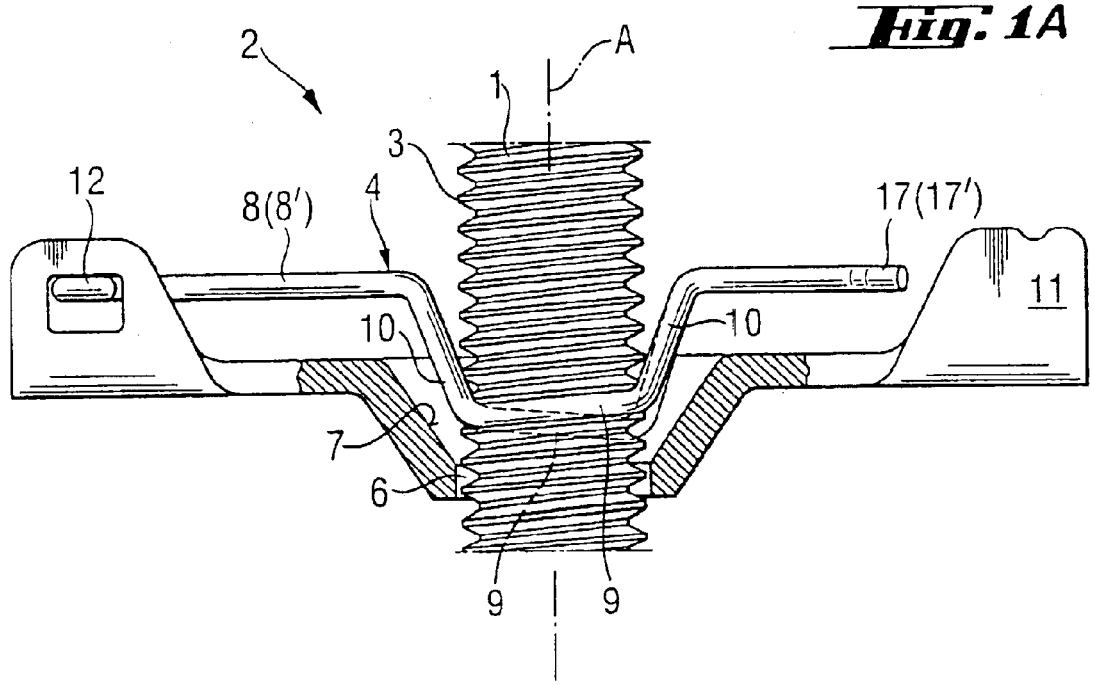
FIG. 1a front elevational, partially cross-sectional view of the quick mounting nut shown in FIG. 1.

According to FIGS. 1 and 1a, a quick mounting nut 2, which receives a threaded bolt 1 with axis A comprises a springing wire clip 4 within a nut housing 5, shown only partially and having a coaxial through-opening 6. The wire clip 4 is formed of a stainless-steel wire spring and partially engages in a thread 3, and, within the opening 6, an inner cone 7 that narrows radially from the axial neutral position of the wire clip 4. The wire clip 4, which is movable axially to a limited extent, partially contacts inside the inner cone 7 in its engaging position. The wire clip 4 has two legs 8, 8' which spring relative to one another. Each of the legs 8, 8', which extend almost parallel to each other, partially engages longitudinally in the threads 3 of the threaded bolt 1 within the radial plane with a circular-arc-shaped middle part 9 which is offset axially by an angled bend 10 and rests against the inner cone 7. The inner circle diameter which can be inscribed in the circular-arc-shaped, tension-free middle part 9 corresponds approximately to the outer diameter of the threaded bolt 1. The wire clip 4 is mounted inside the nut housing 5, whose gripping surfaces 11 form a wing nut, so as to be movable axially to a limited extent via an angled bearing 12 provided in the connection point of the two legs 8, 8'.

According to FIG. 2, the nut housing 5 comprises two shells 13a, 13b which are guided along the wire clip 4 so as to be movable relative to one another to a limited extent along X and which are connected with one another so as to be fixed against relative rotation with respect to each other in a positive-locking manner via snap-in locking means 14. The shells 13a, 13b form a guide between two positions 15 along the wire clip 4 which is embedded therein. The cover shell 13a, which is made of sheet metal, forms a wedge 16 which is directed radially inward and which is arranged between free ends 17, 17' of the legs 8, 8' of the wire clip 4 which are angled in a wedge-shaped manner.

Figure 3:
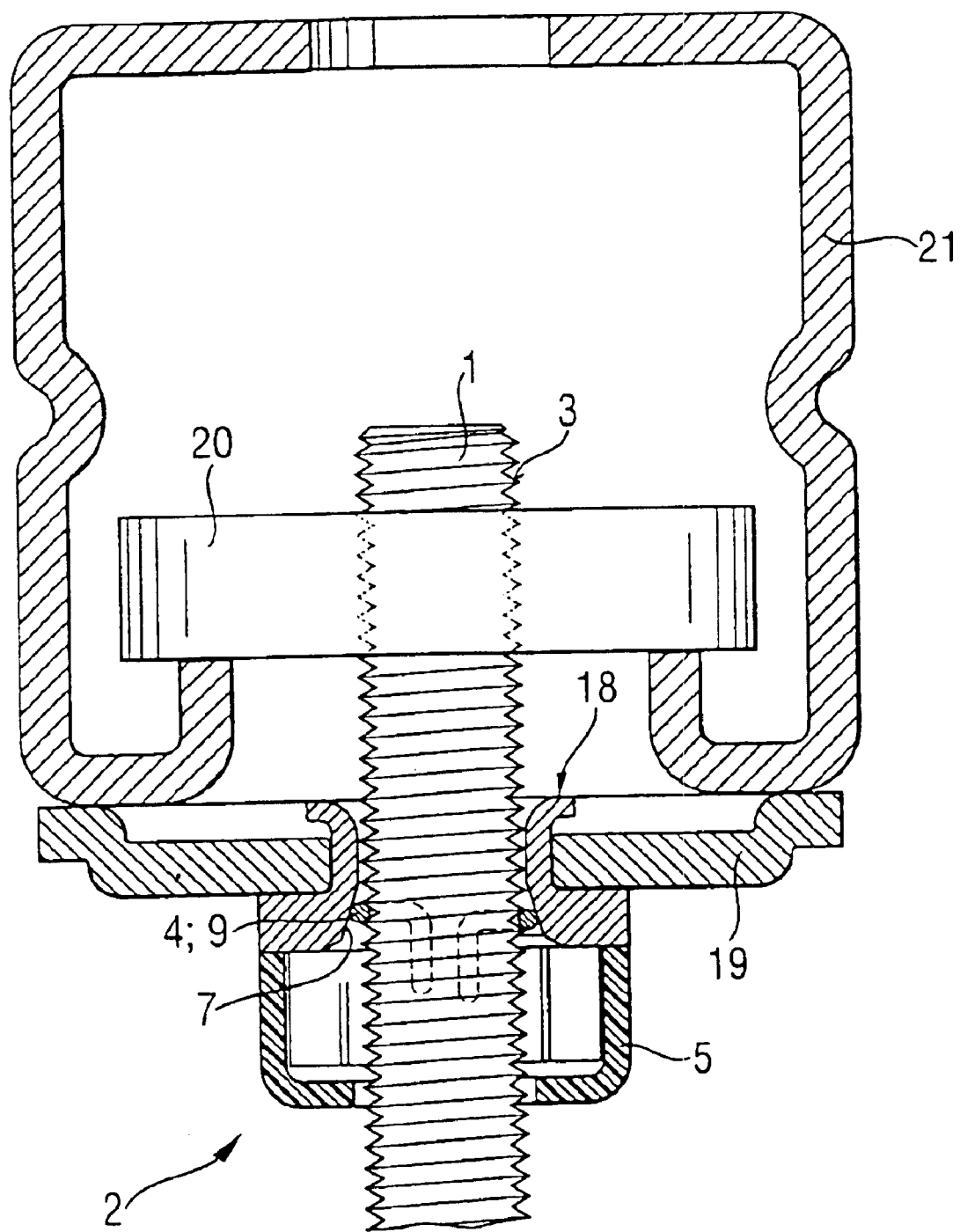
FIG. 3 a cross-sectional view of a fastening system for mounting on installation rails with a quick mounting nut according to the present invention.

In a fastening system, according to FIG. 3, a fastening sleeve 18 is coaxially formed integrally with the side of the nut housing 5 forming the inner cone 7. The quick mounting nut 1 is connected with a pressure plate 19 by the fastening sleeve 18 so as to be rotatable coaxially by a hollow rivet connection. The quick mounting nut 2 with the pressure plate 19 is connected, via the threaded bolt 1 formed as a threaded rod, to a special rail nut 20, which is mounted so as to be fixed with respect to rotation relative to it, and, accordingly, fastens the threaded rod 1 securely to an installation rail 21 arranged partially between the plate 19 and the rail nut 20.

According to FIG. 4, for the quick mounting nut 2, which is formed as a locking nut, the cover shell 13b which is made of a plastic material has, on the inner side, a radially expandable coaxial outer cone sleeve 22 with an angle of 15° to 20° and a radial outer circumferentially extending annular groove 23 for the middle part 9 of the wire clip 4 and in which the wire clip 4 can be secured axially without tensioning. The outer cone sleeve 22 is axially slit. The cover shell 13b has a switching element 24 functioning as unlocking element in the radially outer area. The switching element 24 axially contacts the wire clip 4 which is supported inside the nut housing 5 so as to be offset axially and is fixed axially in the annular groove 23.

According to FIG. 5, for the quick mounting nut 2, which is formed alternatively as a locking nut, the cover shell 13b which is made of a plastic material, with the radially expandable coaxial outer cone sleeve 22 as unlocking means, has two oppositely arranged radially projecting, axially springing projecting arms 25, 25', each of which has, in the radial outer area, an axial bearing pin 26, 26' for the wire clip 4 which is oriented toward the wire clip 4. The projecting arms 25, 25' form expanding springing catch protuberances which snap inside the legs 8, 8' in the radially outer areas of the wire clip 4 in an axially securing manner.

The cover shell 13b forms the gripping surfaces 11 forming a wing nut and extending vertically to the projecting arms 25, 25' which are oriented longitudinally to the wire clip 4.

Figure 6:
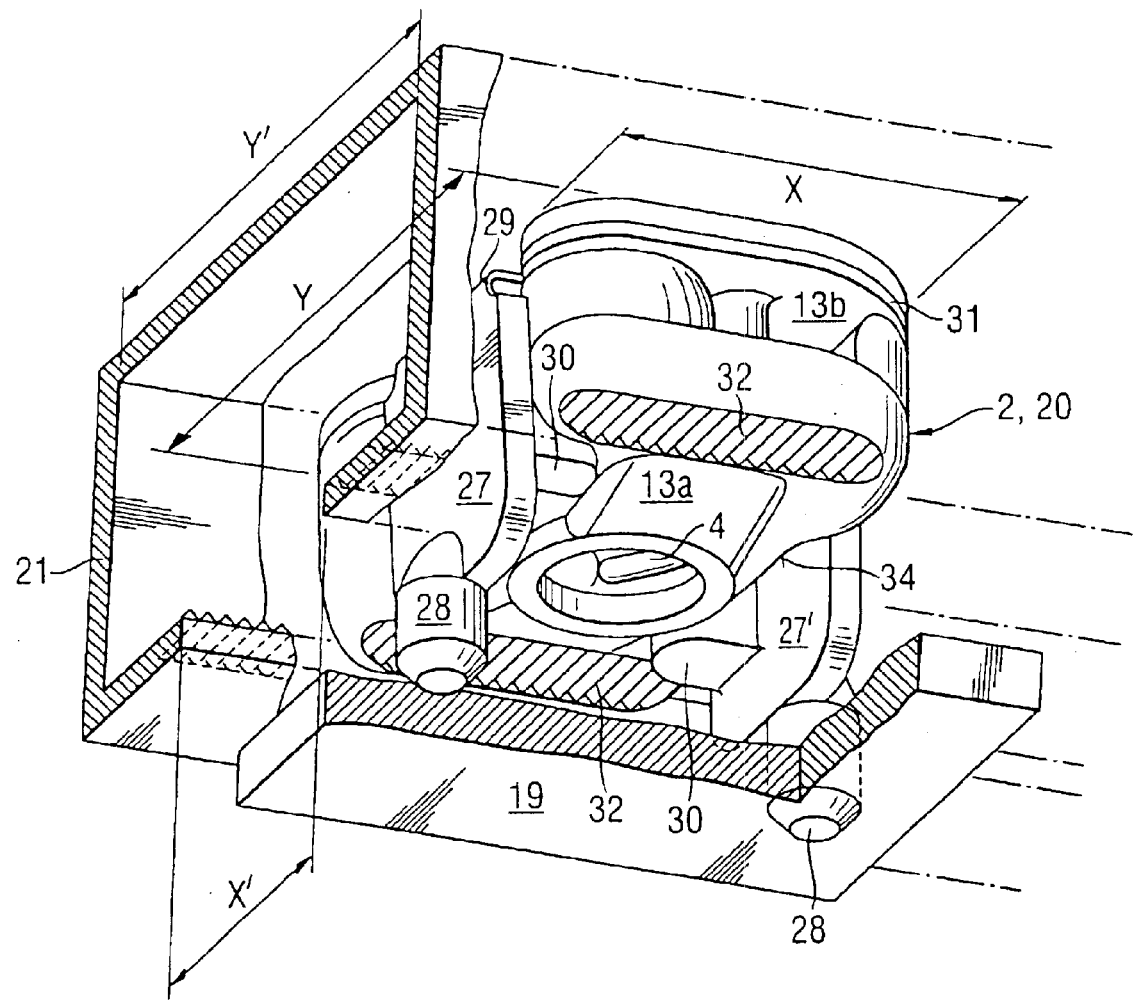
FIG. 6 a perspective, partially cross-sectional view a plug-in rail nut.

According to FIG. 6, a quick mounting nut 2 is constructed as a plug-in rail nut 20. A cover shell 13b of the quick mounting nut 2 is fixedly connected with the pressure plate 19. For this purpose, two webs 27, 27' with mounting pins 28 at the ends are arranged and are secured via respective film hinges 29, to the cover shell 13b and hold the quick mounting nut 2 at a predetermined distance from the pressure plate 19. The webs 27, 27', which are folded up by 90°, extend as to be freely movable axially in associated radial cutouts 34 in the region of the webs 27, 27' of the other, base shell 13a. The webs 27, 27' swivel a hold-down device 30 formed integrally therewith axially over the base shell 13a of the quick mounting nut 2 with integrated wire clip 4. A gap 31 of about 1 mm is formed between the base shell 13a and the cover shell 13b of the quick mounting nut 2. The surface of the quick mounting nut 2 oriented in the direction of the base plate 19 is partially provided with a toothing 32. The prism-shaped basic shape of the quick mounting nut 2 has a width X which is slightly smaller than the opening X' of the C-shaped installation rail 21. The length Y of the nut is somewhat smaller than the inner dimensioning Y' of the installation rail 21. Two diagonally opposed axial edges of the quick mounting nut 2 are rounded in accordance with the circle of diameter Y' which can be inscribed in the installation rail 21.

According to FIG. 7, an alternative fastening system for mounting at installation rails 21 has a first quick mounting nut 2 which is constructed as a rail nut 20 which is fixed with respect to relative rotation and is inserted into a C-shaped installation rail 21 so as to be fixedly connected with the base plate 19. A second quick mounting nut 2', which is constructed as a locking nut and can be screwed in by rotation, is connected via the threaded rod 1, which is guided coaxially through both quick mounting nuts 2, 2', and is arranged on the facing plane partial surfaces 33 of the base plate 19 so that it contacts the latter along a surface.

Though the present invention was shown and described with references to the preferenced embodiments, such are merely illustrative of the present invention and are not to be construed as a limitation thereof, and various modifications of the present invention will be apparent to those skilled in the art. It is therefore, not intended that the present invention be limited to the disclosed embodiments or details thereof, and the present invention includes all variations and/or alternative embodiments within the spirit and scope of the present invention as defined by the appended claims.

What is claimed is:

1. A quick mounting nut, comprising a housing (5) having a through-opening (6) through which a threaded bolt (1) is extendable; and a wire clip (4) located in the through-opening (6) for locking the threaded bolt (1) in the housing and having two legs (8, 8') springable relative to each other and engaging a bolt thread (3) in a locking position of the wire clip (4), the wire clip (4) being axially displaceable between a neutral position in which the bolt (1) can be inserted into the nut and the locking position, the through-opening (6) having an inner cone narrowing radially from the neutral position of the wire clip (4), and the wire clip (4) contacting, at least partially, an inner surface of the cone (1) in the locking position thereof, wherein the wire clip legs (8, 8') form in a radial plane, a circular arc-shaped middle part (9) engaging the bolt thread (3) at least partially along a bolt thread circumference, and wherein the nut housing (5) is formed of at least two shells (13a, 13b), and wherein the nut further comprises locking means (14) for positively connecting the two shells (13a, 13b) without a possibility thereof to rotate relative to each other wherein one of the shells, which is formed as a cover shell (13b), is provided, on an inner side thereof, with a radially expandable coaxial cone sleeve having an outer circumferential groove (23) for receiving the arc-shaped middle part (9) of the wire clip (4) to thereby tensionlessly secure the wire clip (4).

2. A quick mounting nut according to claim 1, further comprising two webs (27,27') for fixedly connecting the cover shell (13b) with a the pressure plate (19).

3. A quick mounting nut according to claim 2, wherein each of the webs (27, 27') is provided with a mounting pin (28) connectable with the pressure plate (19).

4. A quick mounting nut according to claim 2, further comprising two film hinges (29) for pivotally connecting the two webs (27, 27') with the cover shell (13b).

5. A quick mounting nut according to claim 2, wherein at least one of the webs (27) is provided with a hold-down device (30) which presses axially against another of the shells (13a, 13b), which is formed as a base shell (13a) and which contains the wire clip (4) that flexes axially to a limited extent under slight axial prestress.

6. A quick mounting nut according to claim 5, wherein an axial gap (31) is formed between the base shell (13a) and the cover shell (13b) subjected to axial pretensioning.

7. A quick mounting nut according to claim 2, wherein the nut (2) has a surface facing the pressure plate (19) and provided with a toothing (32).

8. A quick mounting nut according to one of claim 2, wherein the nut housing (5) is prism-shaped and has a width (X), which is smaller than an opening (X') of a C-shaped installation rail (21), and a length (Y), which is smaller than an inner dimensioning (Y') of the installation rail (21), and two diagonally opposed axial edges which are rounded corresponding to a circle of diameter (Y') which can be inscribed in the installation rail (21).

9. A mounting assembly, comprising a first quick mounting nut formed as a rail nut (20) and having a housing (5) formed of at least two shells (13a, 13b) and having a through-opening (6) through which a threaded bolt (1) is extendable, and a wire clip (4) located in the through-opening (6) for locking the threaded bolt (1) in the housing and having two legs (8, 8') springable relative to each other and engaging a bolt thread (3) in a locking position of the wire clip (4), the wire clip (4) being axially displaceable between a neutral position in which the bolt (1) can be inserted into the nut and the locking position, the through-opening (6) having an inner cone narrowing radially from the neutral position of the wire clip (4), and the wire clip (4) contacting at least partially an inner surface of the cone (7) in the locking position thereof, and a second quick mounting nut (2').

* * * * *